(12) United States Patent
Ferentz et al.

(10) Patent No.: US 7,849,343 B2
(45) Date of Patent: Dec. 7, 2010

(54) PRE-DETECTION OF POWERED DEVICES

(75) Inventors: Alon Ferentz, Bat Yam (IL); Yair Darshan, Petach Tikva (IL); Dror Korcharz, Bat Yam (IL)

(73) Assignee: Microsemi Corp. - Analog Mixed Signal Group Ltd., Hod Hasharon (IL)

( * ) Notice: Subject to any disclaimer, the term of this patent is extended or adjusted under 35 U.S.C. 154(b) by 1948 days.

(21) Appl. No.: 10/861,405

(22) Filed: Jun. 7, 2004

(65) Prior Publication Data

US 2004/0260794 A1  Dec. 23, 2004

Related U.S. Application Data

(60) Provisional application No. 60/477,607, filed on Jun. 10, 2003.

(51) Int. Cl.
G06F 1/00 (2006.01)
G06F 11/30 (2006.01)

(52) U.S. Cl. .................. 713/340; 713/300
(58) Field of Classification Search .......... 713/300, 713/340; 324/539
See application file for complete search history.

(56) References Cited

U.S. PATENT DOCUMENTS

| | | | |
|---|---|---|---|
| 6,218,930 B1 | 4/2001 | Katzenberg et al. | |
| 6,459,275 B1 * | 10/2002 | Ewalt et al. | 324/539 |
| 6,473,608 B1 | 10/2002 | Lehr et al. | |
| 6,496,103 B1 | 12/2002 | Weiss et al. | |
| 6,535,983 B1 * | 3/2003 | McCormack et al. | 713/310 |
| 6,546,494 B1 | 4/2003 | Jackson et al. | |
| 6,603,220 B2 | 8/2003 | Vergnaud | |
| 6,640,308 B1 | 10/2003 | Keyghobad et al. | |
| 6,643,566 B1 | 11/2003 | Lehr et al. | |
| 6,701,443 B1 * | 3/2004 | Bell | 713/300 |
| 6,954,708 B2 * | 10/2005 | Rakshani et al. | 702/79 |
| 7,061,142 B1 * | 6/2006 | Marshall | 307/106 |
| 7,162,650 B2 * | 1/2007 | Ke et al. | 713/300 |
| 2002/0118023 A1 * | 8/2002 | Ewalt et al. | 324/539 |
| 2003/0036819 A1 | 2/2003 | Lehr et al. | |
| 2003/0043038 A1 * | 3/2003 | Izadinia et al. | 340/568.2 |

FOREIGN PATENT DOCUMENTS

JP  3404283 B2  5/2003

OTHER PUBLICATIONS

IEEE 802.3 af—2003 standard—pp. 37-43, 51-53, 86-88, 100-103, 107-112.

* cited by examiner

*Primary Examiner*—Chun Cao
*Assistant Examiner*—Jaweed A Abbaszadeh
(74) *Attorney, Agent, or Firm*—Simon Kahn

(57) ABSTRACT

A method and apparatus for preventing harmful transients resulting from a probing routine for a valid powered device detection signature in a network, the method comprising: operating power sourcing equipment to provide via its output port a pre-detection output voltage; obtaining an indication of the pre-detection output voltage; comparing the indication of the pre-detection output voltage with a pre-determined value; and in the event that the indication of the pre-detection output voltage is less than the pre-determined value; initiating a probing routine for a valid powered device detection signature. The higher voltage of the probing routine is thus not present at the output port in the absence of pre-detection of a potentially valid powered device detection signature.

28 Claims, 6 Drawing Sheets

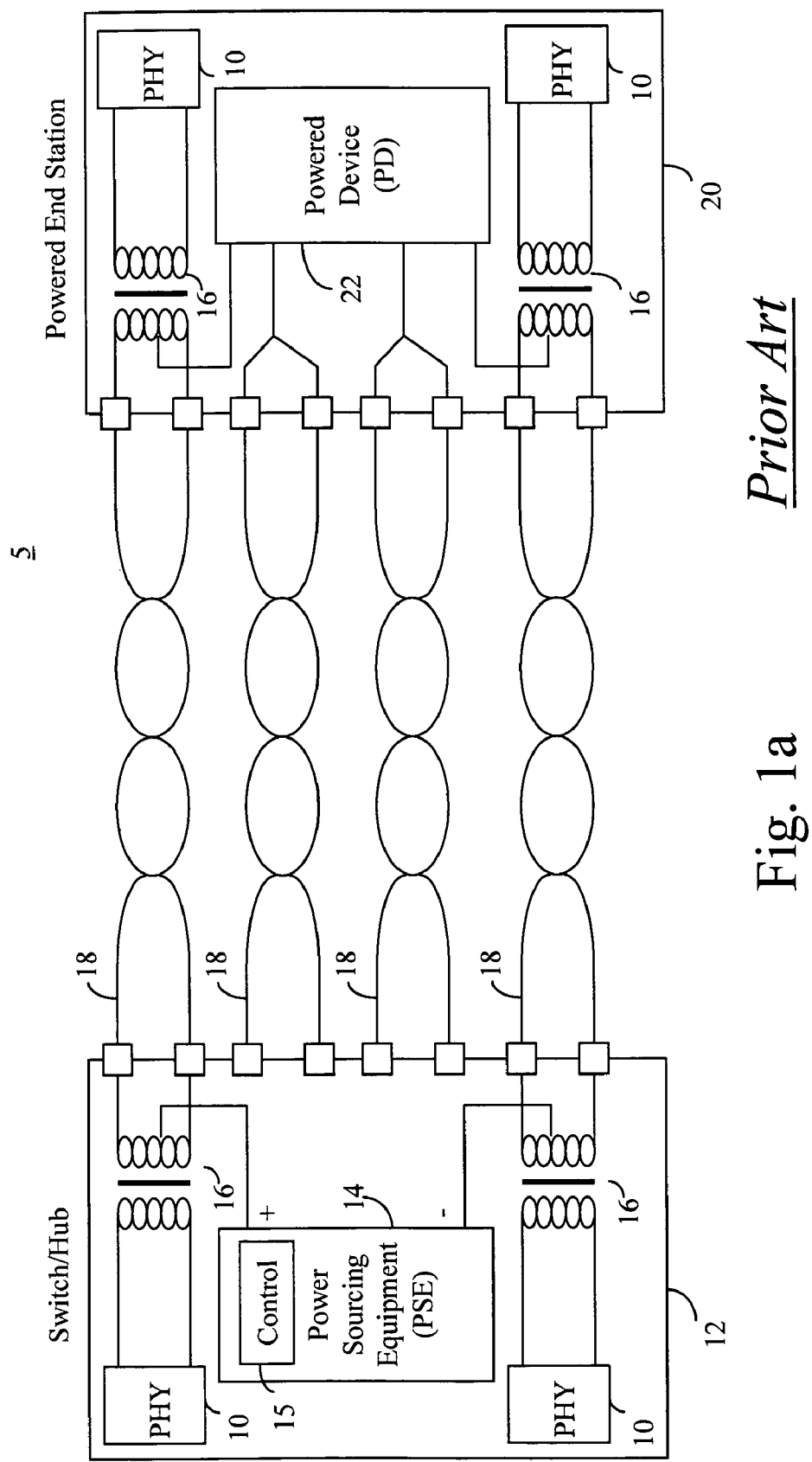
Fig. 1a  *Prior Art*

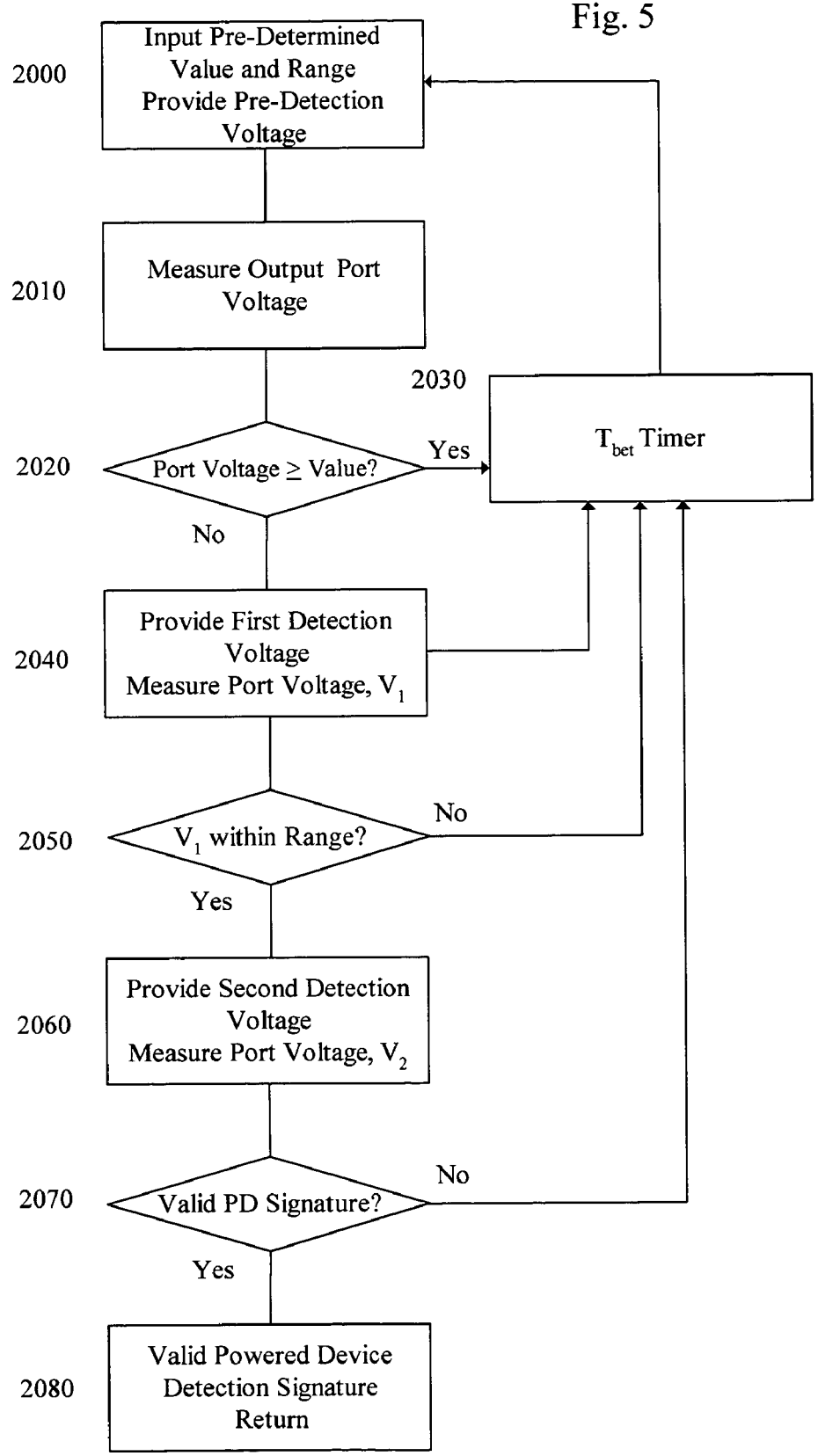

PRE-DETECTION OF POWERED DEVICES

RELATED APPLICATIONS

This application claims priority from U.S. Provisional Patent Application Ser. No. 60/477,607 filed Jun. 10, 2003 entitled "CONTROLLING VOLTAGE/CURRENT TRANSIENTS DURING HOT CONNECTION OF VOLTAGE CARRYING LAN SEGMENTS" the contents of which are incorporated herein by reference.

BACKGROUND OF THE INVENTION

The invention relates generally to the field of power over local area networks, particularly Ethernet networks, and more particularly to a method of minimizing harmful transients while probing for a valid powered device (PD) detection signature.

The growth of local and wide area networks, particularly those based on Ethernet technology, has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power back-up; and centralized security and management.

The IEEE 802.3af-2003 standard, whose contents are incorporated herein by reference, is addressed to powering remote devices over an Ethernet based network. In order to avoid supplying power to data terminal equipment not designed to receive power over Ethernet, a probing mode for detecting a valid PD detection signature is incorporated in the standard. The probing mode electrical requirements allow for a maximum open circuit voltage of 30 Volts. Due to inherent capacitance in the power sourcing equipment, the highest voltage achieved while probing for a valid PD detection signature may, in the absence of a valid detected PD, remain resident for some time across the open terminals.

Structured cables, typically comprising 4 twisted wire pairs terminated in a single plug or connector, are commonly used in Ethernet installations. Unfortunately, when connecting or disconnecting equipment equipped with a connector, not all pins in the connector make simultaneous contact. An asymmetric connection, in which only some connector pins make contact, may create an unintended unbalanced transient discharge path which can damage electrical equipment. In particular, the physical layer controller connected at the switch end or in the equipment being connected or disconnected can experience a high transient voltage caused by an unbalanced discharge through the isolation transformer. Such a high transient voltage may result in burn-out of a physical layer controller or destruction of the equipment being connected or disconnected.

It would therefore be desirable to have a method of probing for a valid PD detection signature while preventing harmful voltage and current transients caused by connection or disconnection of powered devices.

SUMMARY OF THE INVENTION

Accordingly, it is a principal object of the present invention to overcome the disadvantages of prior art in probing for a valid PD detection signature. This is provided in the present invention by supplying a pre-detection stage comprising a very low voltage. The pre-detection stage identifies if the impedance measured across the port, or a voltage measured at the output port, is within a range of values indicative of a device being connected across the port for which detection should be performed. Thus, detection is only performed in the event that a potential valid device is detected. In particular, detection is not performed when the impedance measured across the port is indicative of an open circuit condition, and therefore the high open circuit voltage of up to 30 Volts does not appear across open terminals.

In particular the invention provides for a method for preventing harmful transients resulting from a probing routine for a valid powered device detection signature in a network, the method comprising: operating power sourcing equipment to provide via its output port a pre-detection output voltage; obtaining an indication of the pre-detection output voltage; comparing the indication of the pre-detection output voltage with a pre-determined value; and in the event that the indication of the pre-detection output voltage is less than the pre-determined value; initiating a probing routine for a valid powered device detection signature.

Preferably the operating power sourcing equipment comprises connecting one of a voltage source and a current source to the output port, further preferably the connecting one of a voltage source and a current source to the output port is accomplished through a known impedance. Even further preferably the known impedance comprises a source impedance.

In an exemplary embodiment the initiating a probing routine for a valid powered device detection signature comprises: operating the power sourcing equipment to provide via its output port a first detection output voltage; obtaining an indication of the first detection output voltage; operating the power sourcing equipment to provide via its output port a second detection output voltage different from the first detection output voltage; obtaining an indication of the second detection output voltage; and identifying a valid powered device detection signature as a consequence of the obtained indications of the first and second detection output voltages. Preferably the method further comprises after the stage of obtaining an indication of the first detection output voltage, comparing the obtained indication of the first detection output voltage with a pre-determined range. Even further preferably, the stage of operating the power sourcing equipment to provide via its output port a second detection output voltage is performed only in the event the obtained indication of the first detection output voltage is within the pre-determined range. In a another preferred embodiment the pre-detection output voltage is substantially equivalent to the first detection output voltage.

In another embodiment the pre-detection output voltage comprises two output voltages, the method further comprising determining a difference between the obtained indications of the pre-detection output voltages, the comparing the indication of the pre-detection output voltage being accomplished utilizing the determined difference. In yet another embodiment the power sourcing equipment is operated such that the pre-detection output voltage in the absence of a connected valid powered device is less than or equal to 5 volts, preferably less than or equal to 3 volts.

In an exemplary embodiment the valid powered device detection signature is in accordance with the IEEE 802.3 af standard.

In one embodiment the pre-determined value is representative of a load having an impedance less than 100 Kohm, and in another embodiment the pre-determined value is representative of a load having an impedance less than 75 Kohm.

The invention also provides for power sourcing equipment for detecting and powering a valid powered device in an Ethernet network, the power sourcing equipment comprising: one of a voltage source and a current source; an output port; and control circuitry; the control circuitry being operable to: provide from the one of a voltage source and a current source via the output port a pre-detection output voltage; obtain an indication of the pre-detection output voltage; compare the obtained indication of the pre-detection output voltage with a pre-determined value; and in the event that the obtained indication of the pre-detection output voltage is less than the predetermined value; initiate a probing routine for a valid powered device detection signature.

In an exemplary embodiment the power sourcing equipment further comprises a known impedance, the pre-detection output voltage being provided to the output port through the known impedance from the one of a voltage source or a current source. Preferably the known impedance comprises a source impedance.

In one embodiment the control circuitry is operable such that the pre-detection voltage at the output port in the absence of a connected valid powered device is below a threshold for causing harmful transients.

In an exemplary embodiment the initiate a probing routine for a valid powered device detection signature comprises: provide from the one of a voltage source and a current source via the output port a first detection output voltage; obtain an indication of the first detection output voltage; provide from the one of a voltage source and a current source via its output port a second detection output voltage; obtain an indication of the second detection output voltage at the output port; and identify a valid powered device detection signature as a consequence of the obtained indications of the first and second detection output voltages. Preferably, the control circuitry is further operable after the obtaining of the indication of the first detection output voltage, to compare the obtained indication of the first detection output voltage with a pre-determined range. Further preferably the control circuit is operable to provide via the output port the second detection output voltage only in the event the obtained indication of the first detection output voltage is within the pre-determined range. In one embodiment the pre-detection output voltage is substantially equivalent to the first detection output voltage.

In one embodiment the pre-detection output voltage comprises two pre-detection output voltages, the control circuitry being operable to determine a difference between the obtained indications of the two pre-detection voltages, and wherein the comparing the indication of the pre-detection output voltage is accomplished utilizing the determined difference.

In another embodiment the control circuitry is operable such that the pre-detection output voltage in the absence of a connected valid powered device is less than or equal to 5 volts, preferably less than or equal to 3 volts.

In an exemplary embodiment the valid powered device detection signature is in accordance with the IEEE 802.3 af standard.

In one embodiment the pre-determined value is representative of a valid powered device signature, in another embodiment the pre-determined value is representative of a load impedance less than 100 Kohm, and in yet another embodiment the pre-determined value is representative of a load impedance less than 75 Kohm.

The invention also provides for a method for preventing harmful transients while enabling detection of a valid powered device detection signature in a network, the method comprising: operating power sourcing equipment to provide via its output port a first output voltage; obtaining an indication of the first output voltage; comparing the obtained indication of the first output voltage with a pre-determined value; and in the event that the obtained indication of the first output voltage is less than the predetermined value; operating the power sourcing equipment to provide via its output port a second output voltage thereby probing for a valid powered device detection signature.

The invention also provides for a method for detecting a valid powered device detection signature in a network, the method comprising: operating power sourcing equipment to provide via its output port a first voltage; measuring the first voltage at the output port; comparing the measured first voltage with a pre-determined value; and in the event that the measured first voltage is less than the pre-determined value; operating the power sourcing equipment to provide via its output port at least two additional voltages; measuring the at least two additional voltages at the output port; and determining a valid powered device detection signature utilizing the measured first voltage and the measured two additional voltages.

Preferably, the first voltage comprises a plurality of voltages, the method further comprising calculating a difference between two of the plurality of voltages, the comparing the first voltage with a pre-determined value being accomplished by comparing the difference with a pre-determined value.

The invention also provides for a method for preventing harmful transients while enabling detection of a valid powered device detection signature in a network, the method comprising: operating power sourcing equipment to provide via its output port two first output voltages; obtaining an indication of each of the two first output voltages; determining a difference between the obtained indication of the two first output voltages; comparing the determined difference with a pre-determined value; and in the event that the determined difference is less than the pre-determined value; operating the power sourcing equipment to provide via its output port a second output voltage thereby probing for a valid powered device detection signature.

In one preferred embodiment the stage of probing for a valid powered device detection signature comprises the two first output voltages and the second output voltage. In another preferred embodiment the pre-determined value is indicative of a potentially valid powered device detection signature.

The invention also provides for a system for detecting and powering a valid powered device in an Ethernet network comprising: a powered device; and power sourcing equipment coupled by communication cabling to the powered device, the power sourcing equipment being operable to: provide via its output port a pre-detection voltage; obtain an indication of the pre-detection voltage at the output port; compare the obtained indication of the pre-detection voltage at the output port with a pre-determined value; and in the event that the obtained indication is less than the pre-determined value; initiate a probing routine for a valid powered device detection signature.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1a illustrates a high level block diagram of a first alternative network configuration for remote powering from an endpoint PSE known to the prior art;

FIG. 5 illustrates a high level flow chart of a second embodiment of operation of the power sourcing equipment according to the principle of the invention.

DETAILED DESCRIPTION OF THE PREFERRED EMBODIMENTS

Figure 1B:
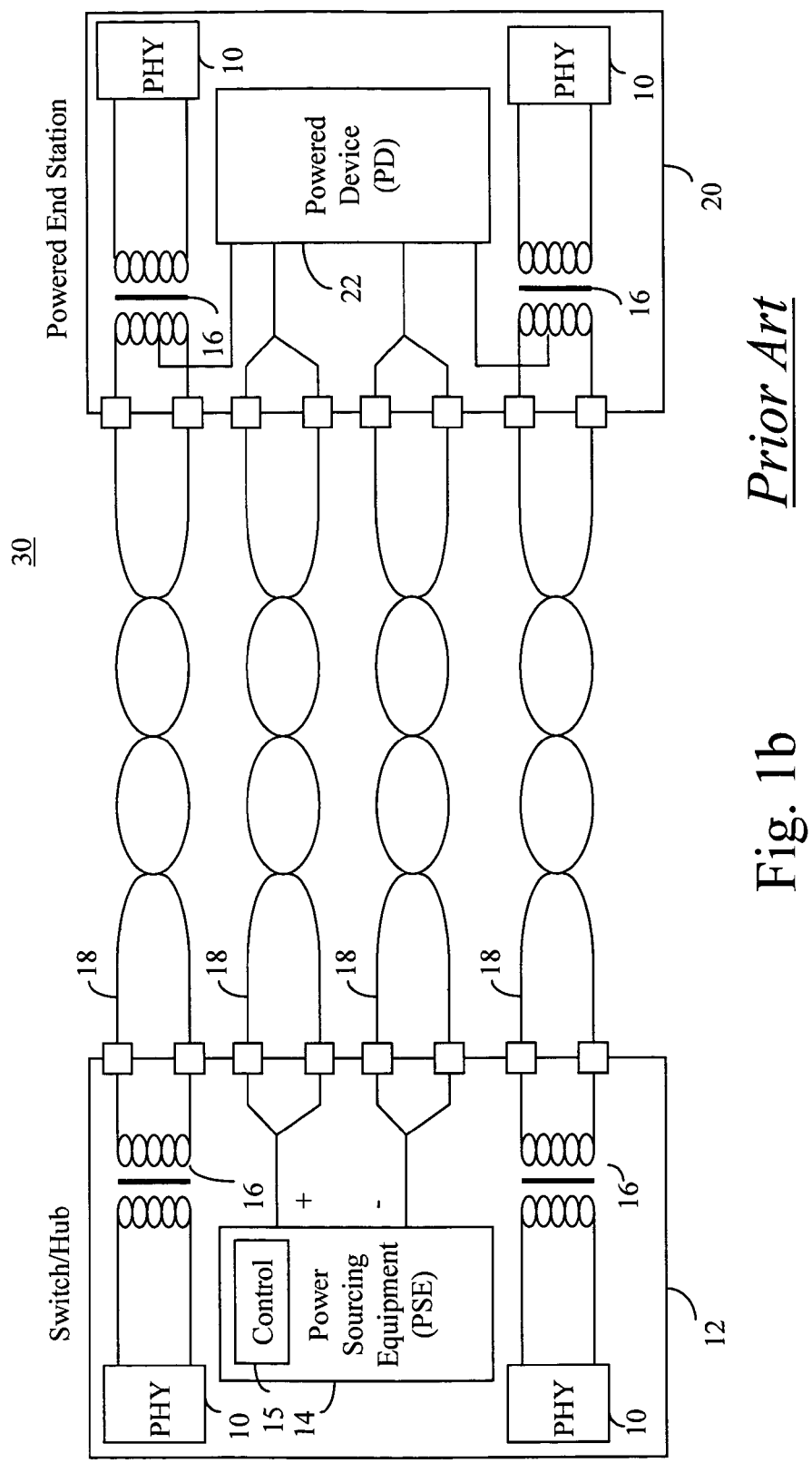
FIG. 1b illustrates a high level block diagram of a second alternative network configuration for remote powering from an endpoint PSE known to the prior art.

The present embodiments enable a method for detecting a valid powered device detection signature in a local area network, such as an Ethernet network, by applying a low voltage to an output port of power sourcing equipment; obtaining an indication of the voltage at the output port; comparing the obtained indication with a pre-determined value; and only in the event that the obtained indication is less than the pre-determined value: applying a first detection voltage to the output port; applying a second detection voltage to the output port; and confirming a valid powered device detection signature as a consequence of the applied first and second detection voltages. In the event that the obtained indication is greater than or equal to the pre-determined value at least the second detection voltage is not applied to the output port, thereby minimizing harmful transients.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The invention is being described as an Ethernet based network, with a powered device being connected thereto. It is to be understood that the powered device is preferably an IEEE 802.3 compliant device preferably employing a 10Base-T, 100Base-T or 1000Base-T connection.

FIG. 1a illustrates a high level block diagram of a first alternative network configuration 5 for remote powering from an endpoint PSE known to the prior art. Network configuration 5 comprises: switch/hub equipment 12 comprising physical layer (PHY) controllers 10, PSE 14 comprising control circuitry 15, and first and second transformers 16; first, second, third and fourth twisted pair connections 18; and powered end station 20 comprising PD 22, third and fourth transformers 16, and PHY controllers 10. PSE 14 located in switch/hub equipment 12 is connected to the center tap of the secondary of each of first and second transformers 16. The primary of each of first and second transformers 16 are connected to communication devices typically through respective PHY controller 10, and the secondary of each of first and second transformers 16 is connected to a respective first end of first and second twisted pair connections 18. The second end of each of first and second twisted pair connection 18 is connected to the primary of third and fourth transformer 16 located within powered end station 20, respectively. The secondary of each of third and fourth transformers 16 is connected to communication devices typically through respective PHY controller 10. The center tap of the primary of each of third and fourth transformers 16, located within powered end station 20, is connected to powered device (PD) 22. In a preferred embodiment, first and second transformers 16 are part of PSE 14, and third and fourth transformers 16 are part of PD 22.

In operation, PSE 14 under control of control circuitry 15 supplies power to PD 22 over first and second twisted pair connection 18, thus supplying both power and data simultaneously over the same twisted pair connections 18, with first twisted pair connection 18 being connected via the center tapped secondary of first transformer 16 to the positive lead of PSE 14 and second twisted pair connection 18 being connected via the center tap secondary of second transformer 16 to the negative lead of PSE 14. PD 22 is operatively connected to the positive lead of PSE 14 through first twisted pair connection 18 and the center tapped primary of third transformer 16 located in powered end station 20 and is operatively connected to the negative lead of PSE 14 through second twisted pair connection 18 and the center tapped primary of fourth transformer 16 located in powered end station 20. Third and fourth twisted pair connections 18 are not utilized, and are thus available as spare connections. Third and fourth twisted pair connections 18 are shown connected to PD 22 in order to allow operation alternatively in a manner that will be described further hereinto below in relation to FIG. 1b over unused third and fourth twisted pair connections 18.

FIG. 1b illustrates a high level block diagram of a second alternative network configuration 30 for remote powering from an endpoint PSE known to the prior art. Network configuration 30 comprises: switch/hub equipment 12 comprising PHY controllers 10, PSE 14 comprising control circuitry 15, and first and second transformers 16; first, second, third and fourth twisted pair connections 18; and powered end station 20 comprising PD 22, third and fourth transformers 16, and PHY controllers 10. The primary of first and second transformers 16 are each connected to communication devices typically through respective PHY controller 10, and the secondary of first and second transformers 16 are each connected to a respective first end of first and second twisted pair connections 18. PSE 14 located in switch/hub equipment 12, is connected to a first end of each of third and fourth twisted pair connections 18. The second end of each of first and second twisted pair connections 18 is connected to the primary of third and fourth transformer 16, respectively, located within powered end station 20, respectively. The secondary of third and fourth transformers 16 are each connected to communication devices typically through respective PHY controller 10. The center tap of the primary of third and fourth transformer 16, located within powered end station 20, is connected to PD 22. The second end of each of third and fourth twisted pair connection 18 is connected to the power input of PD 22. In a preferred embodiment, first and second transformers 16 are part of PSE 14, and third and fourth transformers 16 are part of PD 22.

In operation PSE 14 under control of control circuitry 15 supplies power to PD 22 over third and fourth twisted pair connection 18, with data being supplied over first and second twisted pair connection 18. Power and data are thus supplied over separate twisted pair connections, and are not supplied over a single twisted pair connection. The center tap connection of third and fourth transformer 16 is not utilized, but is shown connected in order to allow operation alternatively as described above in relation to FIG. 1a. The configurations of FIG. 1a and FIG. 1b thus allow for powering of PD 22 either over the same twisted pair connections 18 as data, or over spare twisted pair connections 18.

Figure 1C:
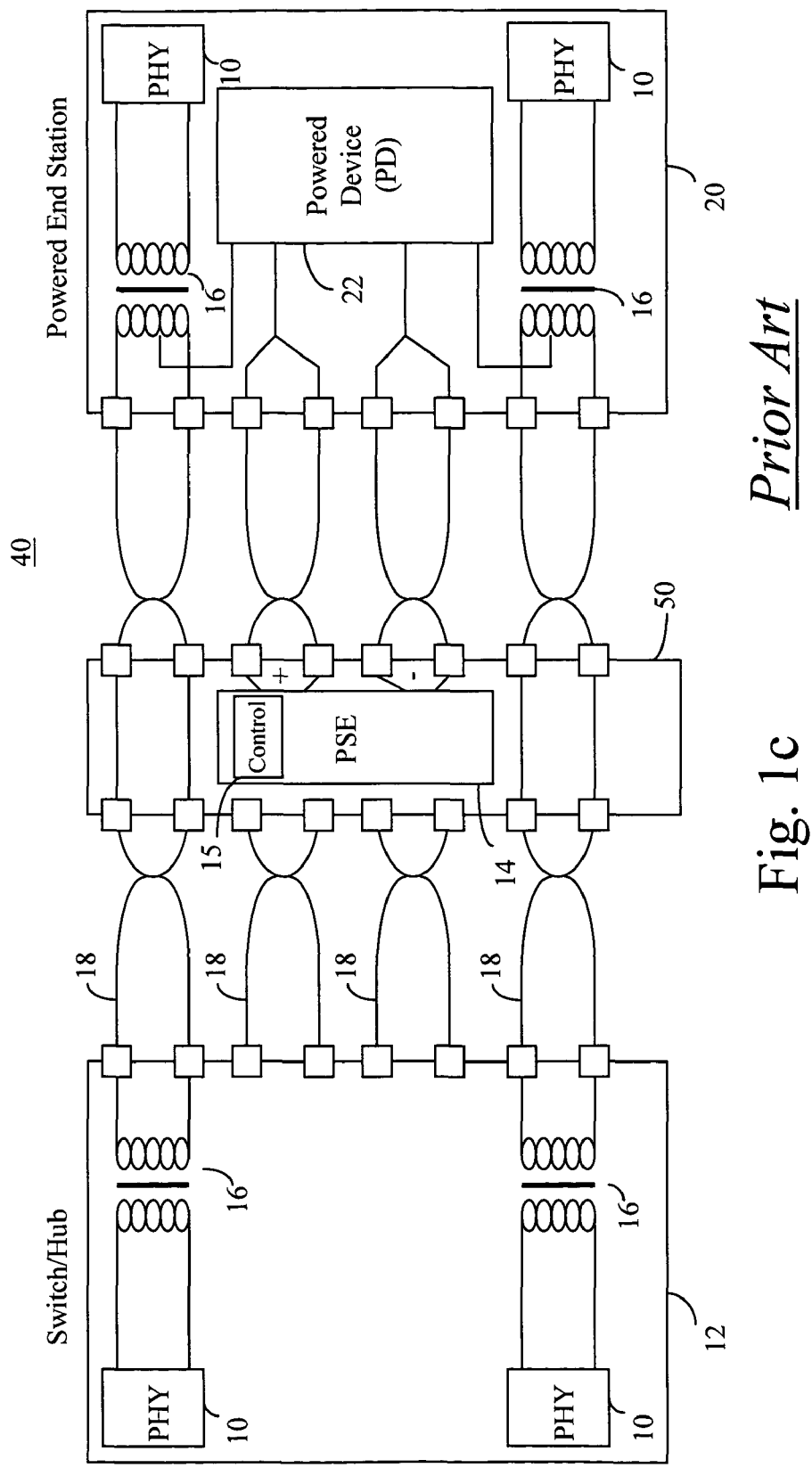
FIG. 1c illustrates a high level block diagram of an alternative network configuration for remote powering from a midspan PSE known to the prior art.

FIG. 1c illustrates a high level block diagram of an alternative network configuration 40 for remote powering from a midspan PSE known to the prior art. Network configuration 40 comprises: switch/hub equipment 12 comprising PHY controllers 10, and first and second transformers 16; first, second third and fourth twisted pair connections 18; powered end station 20 comprising PD 22, third and fourth transformers 16, and PHY controllers 10; and midspan power insertion equipment 50 comprising PSE 14 itself comprising control circuitry 15. The primary of first and second transformers 16 are each connected to communication devices typically through respective PHY controller 10, and the secondary of first and second transformers 16 are each connected to a respective first end of first and second twisted pair connections 18. First and second twisted pair connections 18 are each connected as a straight through connection through midspan power insertion equipment 50. The second end of each of first and second twisted pair connections 18 is connected to the primary of third and fourth transformer 16, respectively, located within powered end station 20. PSE 14 located within midspan power insertion equipment 50, is connected to third and fourth twisted pair connection 18. The secondary of each of third and fourth transformers 16 is connected to communication devices typically through respective PHY controller 10. The center tap of the primary of each of third and fourth transformer 16, located within powered end station 20, is connected to PD 22. The second end of each of third and fourth twisted pair connection 18 is connected to the power input of PD 22. In a preferred embodiment, third and fourth transformers 16 are part of PD 22.

In operation PSE 14, under control of control circuitry 15, located in midspan power insertion equipment 50, supplies power to PD 22 over third and fourth twisted pair connection 18, with data being supplied from switch/hub equipment 12 over first and second twisted pair connection 18. Power and data are thus supplied over separate connections, and are not supplied over a single twisted pair connection. The center tap connections of third and fourth transformer 16 are not utilized, but are shown connected in order to allow operation alternatively as described above in relation to FIG. 1a.

The above descriptions of configuration and operation are not meant to be limiting in any way. Other configurations similar or equivalent to those presented, including using a midspan PSE 14 to supply both power and data over at least one twisted pair connection, and supplying data over all four twisted pair connections 18, can be used in practice without exceeding the scope of the invention.

Figure 1D:
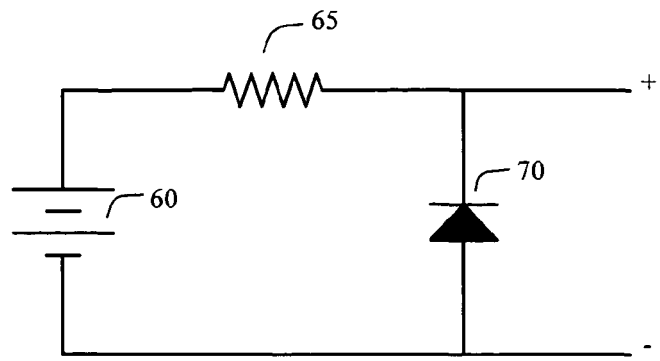
FIG. 1d illustrates a Thevenin equivalent of a detection circuit known to those skilled in the art suitable for detection of a valid PD by probing via a PSE power interface.

FIG. 1d illustrates a Thevenin equivalent of a detection circuit known to those skilled in the art suitable for probing for a valid PD detection signature via a PSE power interface. The detection circuit comprises voltage source 60, source impedance 65, and diode 70. Voltage source 60 is connected to the output port of PSE 14 (FIGS. 1a-1c) through source impedance 65, and diode 70 is connected across the output so as not to conduct during normal operation. The Thevenin equivalent can be transformed by via circuit theory into other circuit parameters, including, but not limited to, replacing voltage source 60 with a current source.

Figure 2:
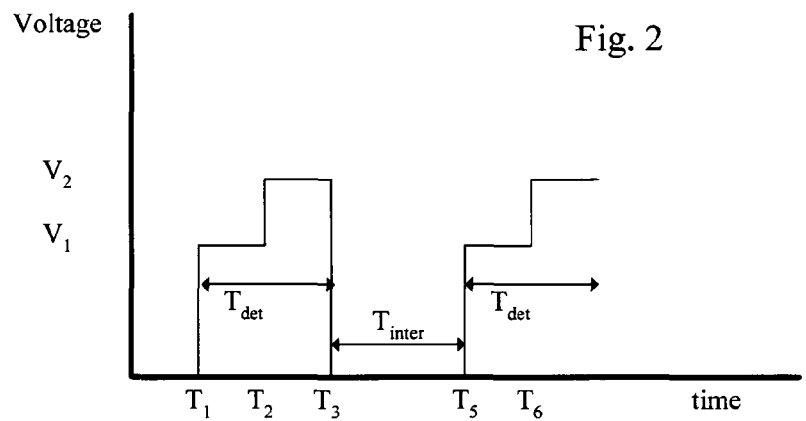
FIG. 2 illustrates a voltage waveform over time of a probing routine for a valid powered device detection signature according to the prior art.

FIG. 2 illustrates a voltage waveform over time of a probing routine for a valid PD detection signature according to the prior art. The x-axis represents time and the y-axis represents output port voltage of PSE 14. A valid PD detection signature indicates that a compatible PD requesting power is connected to the port, and is typically defined as a signature resistance of between 19 Kohm and 26.5 Kohm with a capacitance of up to 150 nF.

Detection of a valid powered device detection signature resistance over an unknown cable requires a plurality of voltage levels. At time $T_1$, PSE 14 begins a probing routine to determine if a valid PD detection signature is found on the port by connecting a first voltage to the port, typically through a known impedance, and measuring the resultant port voltage, $V_1$. At time $T_2$, PSE 14 connects a second voltage to the port and measures the resultant port voltage, $V_2$. Voltage $V_2$ is typically greater than voltage $V_1$, and in the absence of a valid PD may be as high as 30 Volts. At time $T_3$, PSE 14 has determined, as a consequence of measured port voltages $V_1$ and $V_2$ that valid signature has not been detected, and the voltage output is reduced to zero. The interval between $T_1$ and $T_3$, labeled herein as $T_{det}$ is defined as the maximum amount of time allowed for detection. $T_{det}$ is defined by the above mentioned standard as being a maximum of 500 ms, however other times may be defined without exceeding the scope of the invention. While port voltage is shown as being reduced to zero at time $T_3$, in practice the inherent port capacitance may create a condition in which the output port voltage remains at or near voltage $V_2$ after time $T_3$.

PSE 14 delays an implementation dependent amount of time, herein labeled $T_{inter}$, prior to again probing the port. At time $T_5$, PSE 14 again begins probing to determine if a valid PD detection signature is found on the port by connecting a first voltage to the port, typically through a known impedance, and measuring the resultant port voltage, $V_1$. At time $T_6$, PSE 14 connects a second voltage to the port, and measures the resultant port voltage, $V_2$, similarly to that described above in relation to time $T_2$. At time $T_7$, after the expiration of the maximum detection time $T_{det}$, the detection stage is completed.

As indicated above, in the event that no device is connected across the output port, voltage $V_2$ appears across the open output port. In the event of an asymmetric connection being made to the output port, in which not all connector pins are simultaneously connected, voltage appearing across the output port may cause damaging unbalanced transients through a data isolation transformer. The high detection voltage, shown as $V_2$, may remain across the output port during time $T_{inter}$ due to any capacitance and is thus a source of potentially damaging transients.

The above has been described as being accomplished with a first and second voltage, with resultant $V_1$ and $V_2$ being measured. This is not meant to be limiting in any way, and detection may be accomplished with three or more voltages and resultant measurements without exceeding the scope of the invention. Voltage $V_1$ has been described as being less than voltage $V_2$, and adjacent in time to voltage $V_2$, however this is not meant to be limiting in any way. Voltage $V_1$ may be greater than or less than voltage $V_2$. Voltage $V_1$ may be adjacent in time to, or separated in time from voltage $V_2$.

The above has been described as being accomplished by connecting a first and second voltage, typically through a known impedance to an output port. This is not meant to be limiting in any way, and is meant to include all equivalents to the Thenevin equivalent of FIG. 1d. Equivalently, first and second current sources may be applied to the output port, typically through a known impedance.

Figure 3:
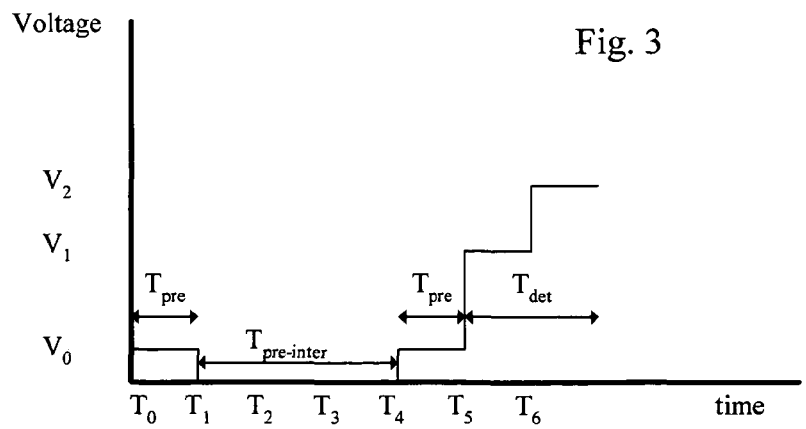
FIG. 3 illustrates a voltage waveform over time according to the principle of the invention.

FIG. 3 illustrates a voltage waveform over time of a first embodiment of a method of probing for a valid detection signature according to the principle of the invention. The x-axis represents time and the y-axis represents output port voltage of PSE 14. As will be explained further hereinto below, PSE 14 accomplishes a pre-detection so as to determine whether any device that is capable of being a valid PD is attached to the port. Only in the event that a measured voltage is indicative of a potentially valid PD is the probing routine for a valid PD detection signature accomplished.

At time $T_0$, PSE 14 connects a pre-detection voltage to the port, typically through a known impedance, and measures the port output voltage, $V_0$. The pre-detection voltage is selected so that the port output voltage is below a threshold at which damaging transients can occur due to connection or disconnection. In a preferred embodiment $V_0$, when no load appears across the port, is less than or equal to 5 volts. In an even further preferred embodiment $V_0$, when no load appears across the port, is less than or equal to 3 volts. In an exemplary embodiment, (not shown) two low voltage levels are used, the difference between the two voltage levels serving as the pre-detection voltage. In an exemplary embodiment the difference between the two voltage levels is on the order of 3 volts.

PSE 14 measures the actual voltage across the port, and based on the voltage set by PSE 14, and the source or other internal impedance of PSE 14, determines the impedance of the load across the port is representative of a potentially valid PD. In the event that the measured port voltage is greater than or equal to a predetermined value, at time $T_1$ no detection is attempted, and the pre-detection voltage is disconnected. The pre-detection time from $T_0$ to $T_1$ is herein labeled $T_{pre}$. Thus the voltage at the output of the port is restricted to a low voltage incapable of causing damaging transients. In a preferred embodiment the predetermined value is representative of a load across the output port of less than 100 Kohm, preferably less than 75 Kohm. It is a particular feature of the invention that a precise value is not required to be obtained by the pre-detection. A single low voltage or a combination of a plurality of low voltages may be utilized without exceeding the scope of the invention. Calculation of a precise impedance is not required, and a measurement indicating that the output port voltage is within an acceptable range, preferably selected to be representative of an appropriate range of a potentially valid PD detection signature, is sufficient.

PSE 14 delays an implementation dependent amount of time, herein labeled $T_{pre-inter}$, prior to again probing the port. At time $T_4$, PSE 14 again accomplishes a pre-detection, for a time interval $T_{pre}$, to determine whether a potentially valid PD detection signature is attached to the port. Thus, at time $T_4$, PSE 14 connects a pre-detection voltage, typically through a known impedance, to the output port, and measure the port output voltage, $V_0$. At time $T_5$, PSE 14 has determined that the output port voltage is less than a pre-determined value, and therefore a valid PD, for which detection should be accomplished, may be attached to the port.

At time $T_5$, PSE 14 begins a probing routine to determine if a valid PD detection signature is found on the port by connecting a first voltage to the port, typically through a known impedance, and measuring the resultant port voltage, $V_1$, in a manner similar to that described above in relation to time $T_5$ of FIG. 2. At time $T_6$, PSE 14 connects a second voltage to the port, and measures the resultant port voltage, $V_2$, similarly to that described above in relation to time $T_6$ of FIG. 2. Thus detection is accomplished in a manner similar to that described above in relation to FIG. 2, however the detection voltages are only applied in the event that the pre-detection has determined the possibility of a valid attached PD. In particular, in the event that no device is connected across the output port, the voltage across the open terminals will be restricted to voltage $V_0$, which as indicated above is selected to be below the level at which damaging transients will occur.

The above has been described as having a single voltage being used for pre-detection, the single voltage being lower than the first detection voltage. This is not meant to be limiting in any way. The pre-detection voltage may be the same as the first detection voltage, or greater than the first detection voltage without exceeding the scope of the invention. In another embodiment, the pre-detection voltage comprises a plurality of voltages used to determine the impedance connected across the port. Preferably, the difference between two of the plurality of pre-detection voltages is used to determine that a potentially valid PD detection signature if found across the port.

The above has been described as being accomplished by connecting a pre-detection voltage, first and second voltage, typically through a known impedance to an output port. This is not meant to be limiting in any way. Equivalently, pre-detection, first and second current sources may be applied to the output port, typically through a known impedance, without exceeding the scope of the invention. Any implementation equivalent to the Thenevin equivalent of FIG. 1d may be utilized without exceeding the scope of the invention.

Figure 4:
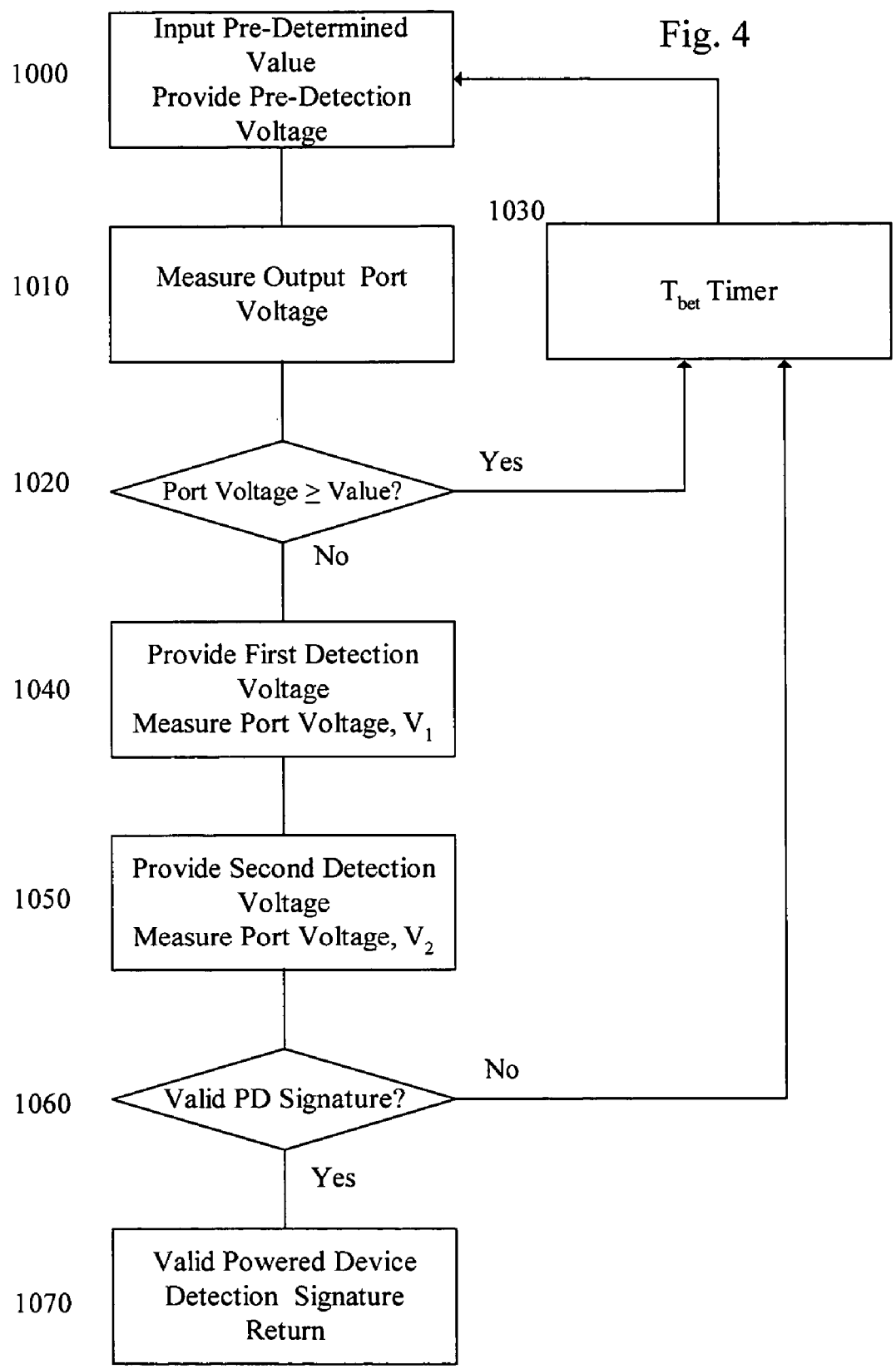
FIG. 4 illustrates a high level flow chart of a first embodiment of the operation of power sourcing equipment according to the principle of the invention.

FIG. 4 illustrates a high level flow chart of a first embodiment of the operation of control circuitry 15 of PSE 14. In step 1000, pre-detection begins by inputting a pre-determined value to determine whether detection is to be attempted, and providing a suitable pre-detection voltage via the output port, preferably through a known impedance. In step 1010 the output port voltage is measured. In step 1020, the measured output port voltage obtained in step 1010 is compared to the predetermined value input in step 1000. In an exemplary embodiment, the pre-determined value is representative of a load impedance attached to the port of less than 100 Kohm, preferably less than 75 Kohm.

In the event that the measured voltage is greater than or equal to the pre-determined value, in step 1030 a timer is set. After expiration of the timer, step 1000 is repeated. The use of a timer is for illustration purposes, and is not meant to be limiting in any way. In place of a timer, the system may run step 1000 based on a recorded event or other criteria without exceeding the scope of the invention. Thus, in the event that the impedance across the port is greater than or equal to the pre-determined value, as represented by the measured pre-detection output port voltage, detection voltages $V_1$ and $V_2$ are not presented across the port.

In the event that in step 1020 the measured pre-detection output port voltage was less than the pre-determined value, in step 1040 the probing routine for a valid PD detection signature begins, and a first detection voltage is provided via the output port, and the resultant output port voltage $V_1$ is measured. In step 1050, a second detection voltage is provided via the output port, and the resultant output port voltage $V_2$ is measured.

In step 1060, the results of the detection process are analyzed to determine if a valid PD detection signature has been found. As a consequence of measured output port voltages $V_1$ and $V_2$, a signature resistance of a device connected across the port is calculated. In the event that a valid PD detection signature has been found, in step 1070 the system returns a valid PD detection signature flag.

In the event that in step 1060 a valid PD signature was not detected, step 1030 as described above is run.

The above has been described as having two detection voltages with resultant port voltages $V_1, V_2$. This is not meant to be limiting in any way. Three or more detection voltage may be utilized without exceeding the scope of the invention. The above has been described as having a single pre-detection voltage with resultant port voltage $V_0$. This is not meant to be limiting in any way, and two or more pre-detection voltages may be utilized without exceeding the scope of the invention. Preferably, in the event that two or more pre-detection voltage are utilized, the difference between two pre-detection voltages are compared in step 1020 with the pre-determined value. Utilizing two or more pre-detection values advantageously compensates for any DC offset at the output port.

The above has been described as advantageously minimizing harmful unbalanced transients, however this is not meant to be limiting in any way. The invention also advantageously minimizes noise, such as electromagnetic interference (EMI).

Further advantageously, the measured pre-detection voltage, or voltages, is utilized as part of the calculation of the signature resistance. The use of three values as part of the total PD probing and validation routine adds robustness to the routine.

FIG. 5 illustrates a high level flow chart of a second embodiment of the operation of control circuitry 15 of PSE 14. In step 2000, pre-detection begins by inputting a pre-determined value to determine whether detection is to be attempted; inputting a pre-determined range for voltage $V_1$; and providing a suitable pre-detection voltage via the output port, preferably through a known impedance. In step 2010 the resultant output port voltage is measured. In step 2020 the measured pre-detection output port voltage obtained in step 2010 is compared to the pre-determined value input in step 2000. In an exemplary embodiment, the pre-determined value is representative of a load impedance attached to the port of less than 100 Kohm, preferably less than 75 Kohm.

In the event that the measured voltage is greater than or equal to the pre-determined value, in step 2030 a timer is set. After expiration of the timer, step 2000 is repeated. The use of a timer is for illustration purposes, and is not meant to be limiting in any way. In place of a timer, the system may run step 2000 based on a recorded event or other criteria without exceeding the scope of the invention. Thus, in the event that the impedance across the port is greater than or equal to the pre-determined value, as represented by the measured pre-detection output port voltage, detection voltages $V_1$ and $V_2$ are not presented across the port.

In the event that in step 2020 the measured pre-detection output port voltage was less than the pre-determined value, in step 2040 the probing routine for a valid PD detection signature begins, and a first detection voltage is provided via the output port, and the resultant output port voltage $V_1$ is measured. In step 2050, the voltage measured in step 2040, $V_1$, is compared with the range of suitable voltages input in step 2000. The range of suitable voltages is selected as a further check to ensure that a valid PD may possibly be connected prior to completing the detection process. Such a further check acts as a double check in the event of an offset voltage preventing the proper impedance value from being detected in step 2010. It is to be understood that steps 2020 and step 2050 can be combined into a single step, without exceeding the scope of the invention.

In the event that in step 2050, $V_1$ is outside of the range of suitable voltages, step 2030 is accomplished. In the event that in step 2050, $V_1$ is within the range of suitable voltages, in step 2060, a second detection voltage is provided via the output port, and output port voltage $V_2$ is measured.

In step 2070, the results of the detection process are analyzed to determine if a valid PD detection signature has been found. As a consequence of measured output port voltages $V_1$ and $V_2$ a signature resistance of a device connected across the port is calculated. In the event that a valid PD detection signature has been found, in step 2080 the system returns a valid PD detection signature flag.

In the event that in step 2070 a valid PD detection signature was not detected, step 2030 as described above is run.

The above has been described as having two detection voltages with resultant output port voltages $V_1, V_2$. This is not meant to be limiting in any way. Three or more detection voltages may be utilized without exceeding the scope of the invention. The above has been described as having a single pre-detection voltage with resultant output port voltage $V_0$. This is not meant to be limiting in any way, and two or more pre-detection voltages may be utilized without exceeding the scope of the invention. Preferably, in the event that two or more pre-detection voltage are utilized, the difference between two pre-detection voltages are compared in step 2020 with the pre-determined value. Utilizing two or more pre-detection values advantageously compensates for any DC offset at the output port.

The above has been described as advantageously minimizing harmful unbalanced transients, however this is not meant to be limiting in any way. The invention also advantageously minimizes noise, such as electromagnetic interference (EMI).

Further advantageously, the measured pre-detection voltage, or voltages, is utilized as part of the calculation of the signature resistance. The use of three values as part of the total PD probing and validation routine adds robustness to the routine.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

We claim:

1. A method for preventing harmful transients resulting from a probing routine for a valid powered device detection signature in a network, the method comprising:
    providing a pre-detection voltage to the output port of a power sourcing equipment via an impedance, said provided pre-detection voltage restricted so that voltage at the output port in the absence of a load across the output port is less than a predetermined threshold at which damaging transients can occur, said predetermined threshold less than or equal to 5 volts;
    obtaining an indication of voltage at the output port of the power sourcing equipment responsive to said provided pre-detection voltage;
    comparing said obtained indication of voltage at the output port of the power sourcing equipment responsive to said provided pre-detection voltage with a pre-determined value; and
    initiating, only in the event that said obtained indication of voltage at the output port of the power sourcing equipment responsive to said provided pre-detection voltage is less than said pre-determined value, a probing routine for a valid powered device detection signature.

2. A method according to claim 1, wherein said providing a pre-detection voltage comprises connecting one of a voltage source and a current source to the output port via the impedance.

3. A method according to claim 2, wherein the impedance comprises a source impedance.

4. A method according to claim 1, wherein said initiating a probing routine for a valid powered device detection signature comprises:
    providing a first detection voltage to the output port of the power sourcing equipment via the impedance;
    obtaining an indication of voltage at the output port of the power sourcing equipment responsive to the provided first detection voltage;
    providing a second detection voltage to the output port of the power sourcing equipment via the impedance, said provided second detection voltage different from said provided first detection voltage;
    obtaining an indication of voltage at the output port of the power sourcing equipment responsive to the provided second detection voltage; and
    identifying a valid powered device detection signature as a consequence of said obtained indications of said voltages at the output port responsive to each of the provided first and second detection voltages.

5. A method according to claim 4, further comprising comparing said obtained indication of voltage at the output port of the power sourcing equipment responsive to the provided first detection voltage with a pre-determined range.

6. A method according to claim 5, wherein said providing a second detection voltage at the output port of the power sourcing equipment is performed only in the event said obtained indication of voltage at the output port of the power sourcing equipment responsive to the provided first detection voltage is within said pre-determined range.

7. A method according to claim 4, wherein said pre-detection voltage is substantially equivalent to said first detection voltage.

8. A method according to claim 1, wherein said pre-detection voltage comprises two voltage levels, and wherein said obtaining an indication of voltage at the output port of the power sourcing equipment responsive to said provided pre-detection voltage comprises obtaining an indication of voltage at the output port for each of said two voltage levels, the method further comprising determining a difference between said obtained indications of voltages at the output port for each of said two voltage levels, said comparing with the pre-determined value being accomplished utilizing said determined difference.

9. A method according to claim 1, wherein said predetermined threshold is less than or equal to 3 volts.

10. A method according to claim 1, wherein said pre-determined value is representative of a load having an impedance less than 100 Kohm.

11. A method according to claim 1, wherein said pre-determined value is representative of a load having an impedance less than 75 Kohm.

12. Power sourcing equipment for detecting and powering a valid powered device in an Ethernet network, the power sourcing equipment comprising:
    one of a voltage source and a current source;
    an impedance;
    an output port; and
    a control circuitry, said one of a voltage source and a current source arranged to be connected via said impedance to said output port responsive to said control circuitry;
    said control circuitry arranged to:
        provide from said one of a voltage source and a current source via said impedance a pre-detection voltage, said pre-detection voltage restricted so that voltage at the output port in the absence of a load across the output port is less than a predetermined threshold at which damaging transients can occur, said predetermined threshold less than or equal to 5 volts;
        obtain an indication of voltage at said output port responsive to said pre-detection voltage;
        compare said obtained indication of voltage at said output port responsive to said pre-detection voltage with a pre-determined value; and
        initiate, only in the event that said obtained indication of voltage at said output port responsive to said pre-detection voltage is less than said pre-determined value, a probing routine for a valid powered device detection signature.

13. Power sourcing equipment according to claim 12, wherein said impedance comprises a source impedance.

14. Power sourcing equipment according to claim 12, wherein said initiation of a probing routine for a valid powered device detection signature comprises:
    provide from said one of a voltage source and a current source via said impedance to said output port a first detection voltage;

obtain an indication of voltage at said output port responsive to said provided first detection voltage;
provide from said one of a voltage source and a current source via said impedance to said output port a second detection voltage different from said first detection voltage;
obtain an indication of voltage at said output port responsive to said provided second detection voltage; and
identify a valid powered device detection signature as a consequence of said obtained indications of said voltages at said output port responsive to each of said provided first and second detection voltages.

15. Power sourcing equipment according to claim 14, wherein said control circuitry is further arranged to compare said obtained indication of voltage at said output port responsive to said provided first detection voltage with a pre-determined range.

16. Power sourcing equipment according to claim 15, wherein said control circuit is arranged to provide said second detection voltage only in the event said obtained indication of voltage at said output port responsive to said provided first detection voltage is within said pre-determined range.

17. Power sourcing equipment according to claim 14, wherein said pre-detection voltage is substantially equivalent to said first detection voltage.

18. Power sourcing equipment according to claim 12, wherein said pre-detection voltage comprises two voltage levels, said control circuitry being arranged to:
obtain an indication of voltage at said output port responsive to each of said two pre-detection voltage levels; and
determine a difference between said obtained indications of voltages at said output port responsive to each of said two pre-detection voltage levels, wherein said comparison of said obtained indication is accomplished utilizing said determined difference.

19. Power sourcing equipment according to claim 12, wherein said predetermined threshold is less than or equal to 3 volts.

20. Power sourcing equipment according to claim 12, wherein said pre-determined value is representative of a load impedance less than 100 Kohm.

21. Power sourcing equipment according to claim 12, wherein said pre-determined value is representative of a load impedance less than 75 Kohm.

22. A method for preventing harmful transients while enabling detection of a valid powered device detection signature in a network, the method comprising:
operating power sourcing equipment to provide via its output port a first voltage, said provided first voltage less than a predetermined threshold at which damaging transients can occur, said predetermined threshold less than or equal to 5 volts;
obtaining an indication of voltage at the output port of the power sourcing equipment responsive to said provided first voltage;
comparing said obtained indication of voltage at the output port of the power sourcing equipment responsive to said provided first voltage with a pre-determined value; and
operating, only in the event that said obtained indication of voltage at the output port of the power sourcing equipment responsive to said provided first voltage is less than said pre-determined value, said power sourcing equipment to provide via its output port a second voltage thereby probing for a valid powered device detection signature.

23. A method for detecting a valid powered device detection signature in a network, the method comprising:
operating power sourcing equipment to provide via its output port a first voltage, said provided first voltage less than a predetermined threshold at which damaging transients can occur, said predetermined threshold less than or equal to 5 volts;
measuring said first voltage at said output port;
comparing said measured first voltage with a pre-determined value; and
operating, only in the event that said measured first voltage is less than said pre-determined value, said power sourcing equipment to provide via its output port at least two additional voltages;
measuring said at least two additional voltages at said output port; and
determining a valid powered device detection signature utilizing said measured first voltage and said measured two additional voltages.

24. A method according to claim 23, wherein said first voltage comprises a plurality of voltages, the method further comprising calculating a difference between two of said plurality of first voltages, said comparing said first voltage with a pre-determined value being accomplished by comparing said difference with a pre-determined value.

25. A method for preventing harmful transients while enabling detection of a valid powered device detection signature in a network, the method comprising:
operating power sourcing equipment to provide via its output port two first voltages, each of said two first voltages less than a predetermined threshold at which damaging transients can occur, said predetermined threshold less than or equal to 5 volts;
obtaining an indication of each of said two first voltages at the output port;
determining a difference between said obtained indication of said two first voltages at the output port;
comparing said determined difference with a pre-determined value; and
operating, only in the event that said determined difference is less than said pre-determined value, said power sourcing equipment to provide via its output port a second voltage thereby probing for a valid powered device detection signature.

26. A method according to claim 25, wherein said probing for a valid powered device detection signature comprises said two first voltages and said second voltage.

27. A method according to claim 25, wherein said pre-determined value is indicative of a potentially valid powered device detection signature.

28. A system for detecting and powering a valid powered device in an Ethernet network comprising:
a powered device; and
power sourcing equipment coupled by communication cabling to said powered device, said power sourcing equipment being arranged to:
provide via its output port a pre-detection voltage, said provided pre-detection voltage less than 5 volts;
obtain an indication of said pre-detection voltage at said output port;
compare said obtained indication of said pre-detection voltage at said output port with a pre-determined value; and
initiate, only in the event that said obtained indication is less than said pre-determined value, a probing routine for a valid powered device detection signature.

* * * * *